United States Patent
Gilchrist et al.

(10) Patent No.: US 8,604,417 B2
(45) Date of Patent: Dec. 10, 2013

(54) TARGETLESS PULSED NEUTRON GENERATOR USING BEAM-BEAM INTERACTION

(75) Inventors: W. Allen Gilchrist, Fort Davis, TX (US); Steven M. Bliven, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/585,557

(22) Filed: Aug. 14, 2012

(65) Prior Publication Data

US 2013/0048847 A1    Feb. 28, 2013

Related U.S. Application Data

(60) Provisional application No. 61/528,009, filed on Aug. 26, 2011.

(51) Int. Cl.
*G01V 5/08* (2006.01)

(52) U.S. Cl.
USPC .................................................. 250/269.1

(58) Field of Classification Search
USPC ............................. 250/269.1–269.8
See application file for complete search history.

(56) References Cited

U.S. PATENT DOCUMENTS

| | | | | |
|---|---|---|---|---|
| 3,603,795 A | * | 9/1971 | Allaud | 376/167 |
| 3,609,366 A | * | 9/1971 | Schwartz | 250/262 |
| 3,973,131 A | * | 8/1976 | Malone et al. | 376/119 |
| 4,047,028 A | * | 9/1977 | Arnold | 376/166 |
| 4,657,724 A | * | 4/1987 | Peelman | 376/119 |
| 5,051,581 A | * | 9/1991 | Hertzog et al. | 250/266 |
| 5,481,362 A | | 1/1996 | Van Den Brink et al. | |
| 6,141,395 A | | 10/2000 | Nishimura et al. | |
| 6,297,507 B1 | * | 10/2001 | Chen et al. | 250/370.11 |
| 6,925,137 B1 | | 8/2005 | Forman | |
| 7,538,319 B2 | | 5/2009 | Jacobi et al. | |
| 2005/0012044 A1 | | 1/2005 | Tadokoro et al. | |
| 2006/0033023 A1 | | 2/2006 | Pemper et al. | |
| 2006/0243898 A1 | | 11/2006 | Gilchrist et al. | |
| 2008/0251710 A1 | | 10/2008 | Riley et al. | |
| 2009/0045329 A1 | * | 2/2009 | Stoller | 250/269.4 |
| 2009/0135982 A1 | * | 5/2009 | Groves | 376/113 |
| 2011/0114830 A1 | | 5/2011 | Reijonen et al. | |
| 2011/0169492 A1 | | 7/2011 | Groves | |

FOREIGN PATENT DOCUMENTS

| | | |
|---|---|---|
| JP | 2000 162390 A | 6/2000 |
| JP | 3090471 B2 | 9/2000 |
| WO | 9819817 A1 | 5/1998 |

OTHER PUBLICATIONS

Duane, B.H., "Fusion Cross Section Theory," Rept. BNWL-1685 (Brookhaven Nat'l Laboratory), (1972).
Miley, G.H. et al., Fusion Cross Section and Reactivities, Rept. COO-2218-17 (Univ. Of Ill., Urbana, IL), (1974).
Huba, J., NRL Plasma Formulary, pp. 44-45; available online: http://wwwppd.nrl.navy.mil/nrlformulary/NRL_FORMULARY_09.pdf. (2009).

* cited by examiner

*Primary Examiner* — Kiho Kim
(74) *Attorney, Agent, or Firm* — Mossman Kumar & Tyler PC

(57) ABSTRACT

Method and apparatus for evaluating an earth formation using a pulsed neutron source comprising of dual beams of oppositely directed hydrogen isotopic ions with timing and focal characteristics of each beam set to accomplish a beam-to-beam focusing interaction to a selected position that extends axially along a sealed tube. This makes it possible to generate pulsed neutrons from a plurality of positions.

20 Claims, 3 Drawing Sheets

TARGETLESS PULSED NEUTRON GENERATOR USING BEAM-BEAM INTERACTION

CROSS-REFERENCE TO RELATED APPLICATION

This application claims priority from U.S. Provisional Patent Application Ser. No. 61/528,009, filed on 26 Aug. 2011, incorporated herein by reference in its entirety.

BACKGROUND OF THE DISCLOSURE

This disclosure relates generally to oil and gas well logging tools. More particularly, this disclosure relates tools for measuring rock formation properties such as density and porosity. This disclosure relates to an improved density and/or porosity tool having a targetless source of pulsed neutrons.

In petroleum and hydrocarbon production, it is desirable to know the porosity and density of the subterranean formation which contains the hydrocarbon reserves. Knowledge of porosity is essential in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas. Measurements using pulsed neutron generators are useful in determining porosity, hydrocarbon saturation, and hydrocarbon type. Pulsed neutron measurements may be used for determining formation $\Sigma$, porosity, density and elemental composition.

If the density of the formation is known, then porosity can be determined using known equations. A variety of tools exist which allow the density of the reservoir to be determined. Most of these tools are effective in determining the density (and hence porosity) of the reservoir when the borehole in which the tool is run is an uncased reservoir and the tool is able to contact the subterranean medium itself. However, once a borehole has been cased, there exists a layer of steel and concrete between the interior of the borehole where the tool is located and the formation itself. The borehole casing makes it difficult for signals to pass between the tool and the reservoir and vice-versa.

Many of the commonly used porosity and density measuring tools rely on the detection of gamma rays or neutrons resulting from activation of either a neutron source downhole or a gamma ray source. Existing logging tools and LWD design considerations rely on established source to detector distances or ratios of distances in the case of multiple detectors to provide various analyses related to the formation and borehole environment. A pulsed beam, partially or wholly of deuterium, is directed onto a suitable target having tritium and pulsed neutrons are emitted from the target.

There are several disadvantages to having a neutron emitting device including a target. These include:
  Increased activation product associated with the target substrate material in the most immediate vicinity of the point of neutron generation
  Degradation of output in time associated with burn through or sputtering of the target assembly's hydrogen occluder.
  Degradation of output associated with contaminant sorptions of the target occluder is possible with a target material.
  Scattering through the matrix material sharply reduces ion kinetic energy and event cross-section. So while the ion penetration depth is on the order of 0.1 μm, virtually all neutrons are produced at the very most beam-ward face of the target. While a sharply defined neutron plane of generation may be a good thing, there is a gross inefficiency inherent in this type of geometry or device due to the coulombic deceleration of the ions penetrating the target matrix material.

It would be desirable to have a pulsed neutron source that does not include the target. The present disclosure satisfies this need.

SUMMARY OF THE DISCLOSURE

One embodiment of the disclosure is an apparatus configured to estimate a value of a property of an earth formation. The apparatus includes a tool having a sealed container configured to be conveyed into a borehole; a first source of ions on the tool configured to convey a first pulsed beam of ions into the sealed container; a second source of ions on the tool spaced apart from the first source of ions configured to convey a second pulsed beam of ions into the sealed container and interact with the first pulsed beam of ions to irradiate the earth formation; at least one detector configured to produce a signal responsive to interaction of the radiation with the earth formation; and a processor configured to estimate the value of the property using the signal.

Another embodiment of the disclosure is a method of estimating a value of a property of an earth formation. The method includes: conveying a tool including a sealed container in a borehole; pulsing a first source of ions on the tool and directing a first pulsed beam of ions into a sealed container; pulsing a second source of ions on the tool spaced apart from the first source of ions and directing a second pulsed beam of ions into the sealed container, interaction of the second pulsed beam with the first pulsed beam of ions generating neutrons that irradiate the earth formation; using at least one detector for producing a signal responsive to interaction of the radiation with the earth formation; and using a processor for estimating the value of the property using the signal.

Another embodiment of the disclosure is a non-transitory computer-readable medium product having stored thereon instructions that when read by a processor cause the processor to execute a method. The method includes: pulsing a first source of ions on a tool conveyed in a borehole in an earth formation and directing a first pulsed beam of ions into a sealed container; pulsing a second source of ions on the tool spaced apart from the first source of ions and directing a second pulsed beam of ions into the sealed container, interaction of the second pulsed beam with the first pulsed beam of ions irradiating the earth formation; using at least one detector for producing a signal responsive to interaction of the radiation with the earth formation; and estimating the value of a property of the earth formation using a signal produced by a detector responsive to interaction of the radiation with the earth formation.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
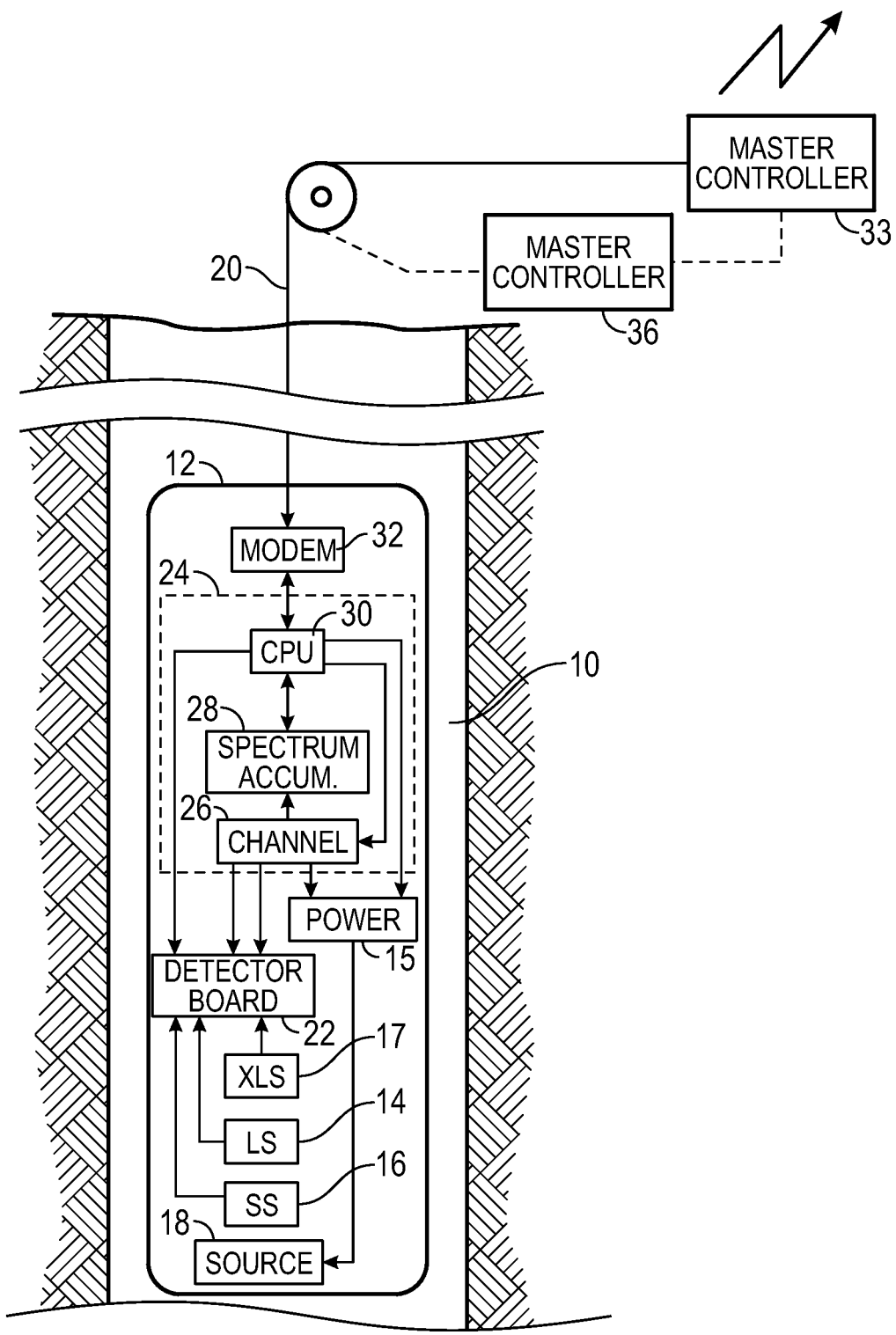
FIG. 1 is an overall schematic diagram of an exemplary nuclear borehole logging system according to one embodiment of the present disclosure.

The system shown in FIG. 1 is an exemplary system for density logging. This is not to be construed as a limitation as the normal source of the present disclosure can also be used for porosity logging or any other application where a pulsed neutron source is needed. Borehole 10 penetrates the earth's surface and may or may not be cased depending upon the particular borehole being investigated. While shown as a wireline system, this is not to be construed as a limitation of the disclosure as the method of the disclosure is applicable to MWD systems and an MWD implementation of the apparatus may be done. Disposed within borehole 10 is subsurface borehole logging instrument 12. The system diagramed in FIG. 1 is a microprocessor-based nuclear borehole logging system using multi-channel scale analysis for determining the timing distributions of the detected gamma rays. It should be noted that while the description is in terms of gamma ray detectors, the disclosure is equally applicable with neutron detectors. Borehole logging instrument 12 includes an extra-long spaced (XLS) detector 17, a long-spaced (LS) detector 14, a short-spaced (SS) detector 16 and pulsed neutron source 18. In one embodiment of the disclosure, XLS, LS and SS detectors 17, 14, 16 are comprised of bismuth-germanate (BGO) crystals coupled to photomultiplier tubes. Typically, to protect the detector systems from the high temperatures encountered in boreholes, some detector systems may be mounted in a Dewar-type flask. The present disclosure envisages eliminating the Dewar flask for reasons discussed below. Also, in one embodiment of the disclosure, source 18 comprises a pulsed neutron source using a D-T reaction wherein deuterium ions are accelerated onto a tritium target, thereby generating neutrons having energy of approximately 14 MeV. The filament current and accelerator voltage are supplied to source 18 through power supply 15. Cable 20 suspends instrument 12 in borehole 10 and contains the required conductors for electrically connecting instrument 12 with the surface apparatus.

The outputs from XLS, LS, and SS detectors 17, 14, 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 33 coupled to cable 20 for recovery of data from instrument 12 and for transmitting command signals to instrument 12. There is also associated with the surface apparatus depth controller 36 which provides signals to master controller 33 indicating the movement of instrument 12 within borehole 10. The master controller 33 is configured to allow the system operator access to provide selected input for the logging operation to be performed by the system. A display unit (not shown) and mass storage unit (not shown) are also coupled to master controller 33. The primary purpose of the display unit is to provide visual indications of the generated logging data as well as systems operations data. A storage unit is provided for storing logging data generated by the system as well as for retrieval of stored data and system operation programs. A satellite link may be provided to send data and or receive instructions from a remote location.

In a borehole logging operation such as is illustrated by FIG. 1, master controller 33 initially transmits system operation programs and command signals to be implemented by CPU 30, such programs and signals being related to the particular borehole logging operation. Instrument 12 is then caused to traverse borehole 10 in a conventional manner, with source 18 being pulsed in response to synchronization signals from channel generator 26. Typically, source 18 is pulsed at a rate between 1000 bursts/second (1 KHz) and 10,000 bursts/second (10 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS, and SS detectors 17, 14, 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such a pulse has amplitude corresponding to energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the borehole by a wireline. However, it is envisaged that the logging device could be part of a measurement while drilling (MWD) bottom hole assembly conveyed into the borehole by a drilling tubular such as a drillstring or coiled tubing. In addition it should be noted that FIG. 1 illustrates a tool in an open hole. The method and apparatus are equally well suited for use in cased holes.

Figure 2:
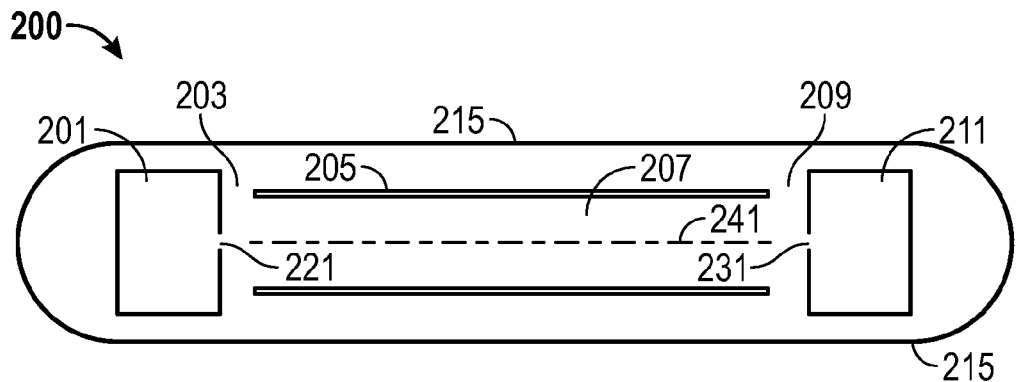
FIG. 2 illustrates one embodiment of the disclosure of targetless pulsed neutron source in which the ion sources are directly opposed according to the present disclosure.

FIG. 2 shows an illustration of a pulsed neutron source according to one embodiment of the present disclosure. The source 200 includes a first ion source 201 and a second ion source 211 enclosed in sealed container, such as sealed tube 215. Ions may be emitted from the ion sources 201, 211 through apertures 221, 231. The ions may be accelerated from the ion sources 201, 211 by a voltage applied to an acceleration electrode 205. The acceleration electrode 205 may have a suitable shape as understood by one of skill in the art, including, but not limited to, a tubular shape. Each ion source 201, 211 has an associated acceleration space 203, 209. Generated ion beam pulses from ion sources 201 and 211 are directed towards each other and interact in the drift space 207 inside the sealed tube 215. The interaction may take place along an axis 241 between the apertures 221, 231. Those versed in the art would recognize that if the two ion beams are pulsed simultaneously, the zone of interaction will be substantially midway between the ion sources 201 and 211. In some embodiments, the zone of interaction may be substantially midway along axis 241. In some embodiments, the zone of interaction may be near the middle of the sealed tube 215.

Each of the sources may include a variety of ions of deuterium and tritium. These include $D^+$ (a deuterium atom from which an electron has been stripped), $T^+$ (a tritium atom from which an electron has been stripped), $D_2^+$ (a deuterium molecule from which an electron has been stripped), $T_2^+$ (a tritium molecule from which an electron has been stripped), and $DT^+$ (a deuterium-tritium molecule from which an electron has been stripped). Interaction between any of the listed ions of one beam with any of the listed ions of the other being will produce neutrons if sufficient energy has been applied in accelerating the ions. Interactions between some combinations have a higher probability of generating neutrons than interactions between other combinations. The present disclosure envisages all such combinations. Those versed in the art and having benefit of the present disclosure would recognize that some of the interactions can occur between ionized atoms and ionized or neutral atoms, others are between ionized atoms and ionized or neutral molecules, and still others are between ionized molecules and ionized or neutral molecules.

In a beam-beam interaction of the present disclosure, some proportion of each of the primary beams may propagate straight though to the opposite ion source counterpart. This is represented as a current in the opposite sense of extracted current flow from the ion source and will have the net effect of a reduced extraction or beam current. The extent of this reduction is dependent on the operational pressure of the tube, the degree of scattering interactions with electrodes, background gas, and other factors understood by those of skill in the art. The degree of reduction reduces the power requirements of the present device.

Figure 3:
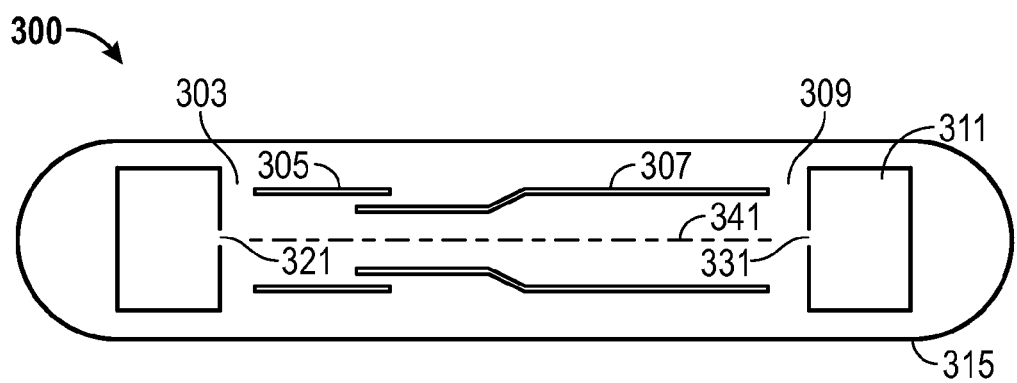
FIG. 3 illustrates a targetless pulsed neutron source having dual voltage on the sealed container according to one embodiment of the present disclosure.

FIG. 3 shows another embodiment of the present disclosure. The tool 300 has two ion sources 301, 311 enclosed in sealed container 315. The ion sources 301, 311 include apertures 321, 331 configured to emit beams of ions. Each ion source 301, 311 has an associated acceleration space 303 309. The ions may be accelerated from the ion sources 301, 311 by acceleration electrodes 305, 307. The acceleration electrodes 305, 307 may be maintained at different voltages to modify the zone of interaction between the beams of ions. Consequently, by altering the relative magnitudes of the voltages of the acceleration electrodes 305, 307, it is possible to move the zone of maximum interaction of the two beams away from midway between the ion sources 301, 311 along axis 341. In principle, this provides the ability to make pulsed neutron measurements using a plurality of different positions of the source. In known processing steps where ratios of distances between the source and a plurality of detectors are used, the additional measurements can be used to improve the accuracy and statistical precision of the estimated properties. The acceleration electrodes 305, 307 may have non-identical shapes as shown or have identical shapes. In some embodiments, the non-identical shapes of the acceleration electrodes 305, 307 may be configured to modify the shape of at least one of beams of ions and/or the location of the zone of interaction. By using acceleration electrodes 305, 307 with different shapes and/or different voltages, the accelerations electrodes 305, 307 may operate as ion optical elements as understood by one of skill in the art.

Figure 4:
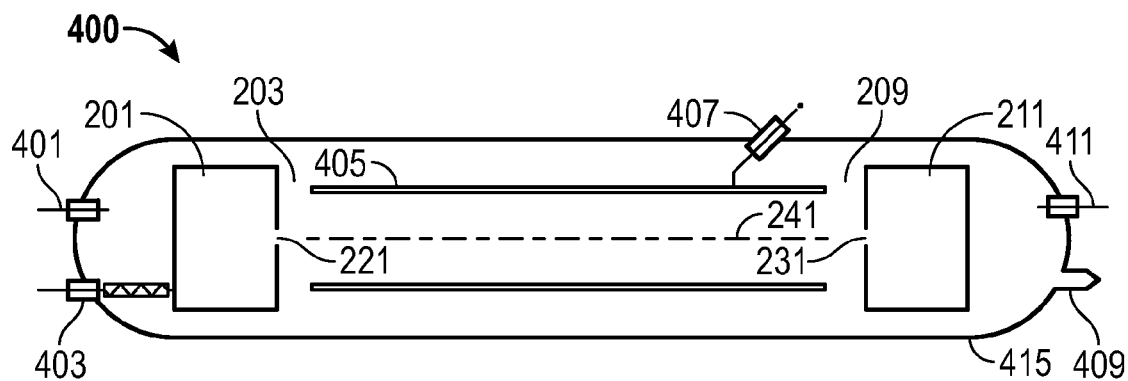
FIG. 4 illustrates a targetless pulsed neutron source with a voltage source connections for the acceleration electrode and ions sources according to another embodiment of the present disclosure.

Turning now to FIG. 4, another embodiment of a pulsed neutron source is shown. The source 400 includes a sealed container, such as tube 415. The electrical conduits for providing ion source controls are denoted by 401 and 411. The electrical or thermo-mechanical coupling conduit for providing gas pressure control is denoted by 403 and the pinch illustrated by 409 allows for device vacuum processing, and following the cold weld pinch, maintains hermeticity of the assembly 400. A voltage applied to an acceleration electrode 405 by way of feed through 407. However, alternative coupling mechanisms for providing this electrical connection can easily be understood and realized by one of skill in the art with the benefit of the present disclosure. It should be noted that these additions to the device of FIG. 2 may be used with other embodiments of the disclosure.

Figure 5:
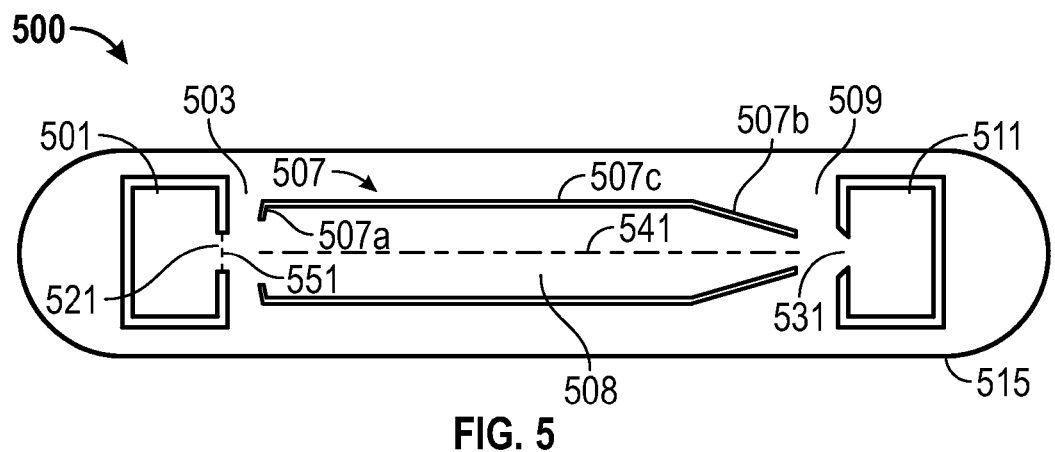
FIG. 5 illustrates a targetless pulsed neutron source with a tapered acceleration electrode for shifting the position of interaction between the two beams according to one embodiment of the present disclosure.

FIG. 5 shows a device 500 in which the sealed container 515 encloses an acceleration electrode 507 that includes asymmetrical tapered sections 507a, 507b and a uniform drift section 507c. Ion sources 501 511 may emit beams of ions that pass through acceleration sections denoted by 503 and 509. The ions may be emitted through apertures 521, 531. The asymmetrical acceleration gaps, gap lengths, diameters, or non-cylindrical components and the ratio of corresponding diameters or non-cylindrical components of the acceleration electrodes and ion source apertures may be configured to allow for asymmetrical focal lengths in the drift space 508 and alter the location of the zone of interaction along the axis 541 between the apertures 521, 531. This is a specific example of a case where the uniform section 507c may be considered to be made of specific ion optical elements while the non-uniform sections 507a, 507b may be considered to be made of non-identical ion optical elements. While acceleration electrode 507 is shown with non-uniform portions 507a, 507b on both ends, this is exemplary and illustrative only, as acceleration electrode 507 may include a non-uniform portion on a single end in some embodiments. Ion source 501 includes a screen 551 configured to prevent equipotential lines from penetrating ion source 501 to the same degree that penetration would occur in unscreened ion source 511. The screen 551 may be configured to limit focusing characteristics of aperture 521 relative to the open aperture 531. The presence and selection of screen 551 may be used to alter the focus of the beam of ions and/or the location of the zone of interaction.

Figure 6:
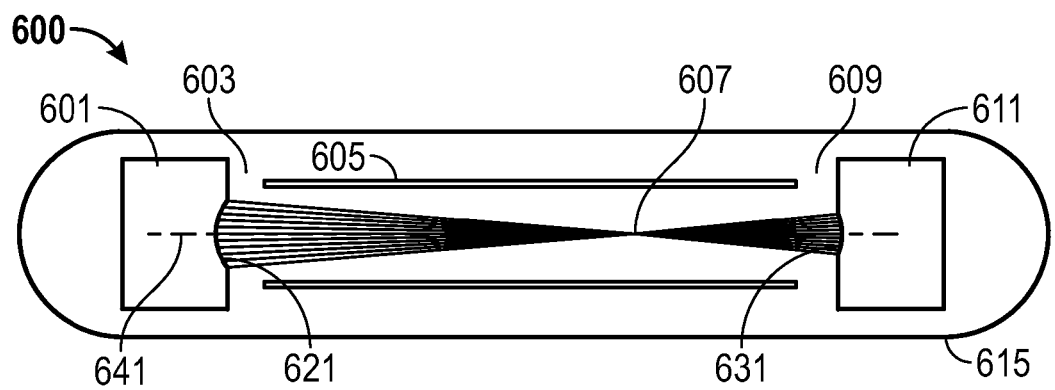
FIG. 6 shows an embodiment of the disclosure in which the two ion source include different apertures to alter the zone of interaction between the beams according to the present disclosure.

FIG. 6 shows another embodiment of a pulsed neutron source of the disclosure. Here, the source 600 includes a sealed container 615 enclosing ion sources 601, 611 configured to emit ions in opposing directions. The beam of ions may be accelerated from the ion sources by a voltage on acceleration electrode 605 and through acceleration sections 603 609. The ion sources 601, 611 each include an aperture 621, 631. Aperture 621 may have different dimensions than aperture 631. This difference between apertures 621, 631 may partially focus the beams of ions and influence the location of the zone of interaction 607 along the axis 641 formed by the apertures 621, 631. Note that while all the ions have the same electric charge, the different masses, ion optical lens aberration effects, and charged particle repulsive or space charge effects prior to, during, or following high acceleration may mean that focusing may not be exact. Moreover, when the two ion sources are pulsed at slightly different times, even for well synchronized updates and very fast pulsing, the result is a zone of interaction indicated by the relatively radially small zone 607. This leads to an increased probability of interaction between the ions in the two different beams and hence a controlled location for particle interaction and emission of neutrons. In one embodiment of the disclosure, the timing of the first source of ions and of the second source of ions are sequenced to create a distributed source of neutrons such as a line source. It should be noted that a magnetic lens may be used for focusing.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable non-transitory computer-readable medium that enables the processors to perform the control and processing. The non-transitory computer-readable medium may include ROMs, EPROMs, EEPROMs, Flash Memories, and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. An apparatus configured to estimate a value of a property of an earth formation, the apparatus comprising:
    a tool including a sealed container configured to be conveyed in a borehole;
    a first source of ions on the tool configured to convey a first pulsed beam of ions in the sealed container;
    a second source of ions on the tool spaced apart from the first source of ions configured to convey a second pulsed beam of ions in the sealed container and interact with the first pulsed beam of ions to irradiate the earth formation;
    at least one detector configured to produce a signal responsive to interaction of the radiation with the earth formation; and
    at least one processor configured to estimate the value of the property using the signal.

2. The apparatus of claim 1 wherein the first pulsed beam and the second pulsed beam each comprise ions selected from: (i) $D^+$ ions, (ii) $T^+$ ions, (iii) $D_2^+$ ions, (iv) $T_2^+$ ions, and (v) $DT^+$ ions.

3. The apparatus of claim 1 wherein a zone of the interaction of the first pulsed beam and the second pulsed beam is substantially midway between the first source of ions and the second source of ions.

4. The apparatus of claim 1 further comprising a first acceleration electrode configured to accelerate ions from the first source of ions and maintained at a first potential and a second acceleration electrode configured to accelerate ions from the second source of ions and maintained at a second potential, and wherein a zone of interaction of the first pulsed beam and the second pulsed beam is not substantially midway between the first source of ions and the second source of ions.

5. The apparatus of claim 1 wherein the sealed container has a first section comprising a first ion optical element and a second section comprising a second ion optical element, where first ion optical element is not identical to the second ion optical element, and wherein a zone of interaction of the first pulsed beam and the second pulsed beam is not substantially midway between the first source of ions and the second source of ions.

6. The apparatus of claim 1 wherein the first source of ions and the second source of ions are pulsed substantially simultaneously.

7. The apparatus of claim 1 wherein the first source of ions and the second source of ions are pulsed at different times.

8. The apparatus of claim 1 wherein the timing of the first source of ions and the second source of ions are sequenced to create a distributed source of neutrons.

9. The apparatus of claim 1 further comprising a conveyance device configured to convey the tool into the borehole, the conveyance device being selected from: (i) a wireline and (ii) a bottom hole assembly on a drilling tubular.

10. The apparatus of claim 1 wherein the property is selected from: (i) a formation $\Sigma$, (ii) a formation porosity, (iii) a formation density and (iv) an elemental composition.

11. A method of estimating a value of a property of an earth formation, the method comprising:
    estimating the value of the property using a signal produced by at least one detector conveyed in a borehole penetrating the earth formation and configured to be responsive to an interaction of neutrons with the earth formation, the neutrons being generated by an interaction in a sealed container between a first pulsed beam of ions generated by a first source of ions and a second pulsed beam of ions generated by a second source of ions.

12. The method of claim 11 wherein the first pulsed beam and the second pulsed beam each comprise ions selected from: (i) $D^+$ ions, (ii) $T^+$ ions, (iii) $D_2^+$ ions, (iv) $T_2^+$ ions, and (v) $DT^+$ ions.

13. The method of claim 11 further comprising defining a zone of the interaction of the first pulsed beam and the second pulsed beam to be substantially midway between the first source of ions and the second source of ions.

14. The method of claim 11 further comprising:
    maintaining at a first potential a first acceleration electrode configured to accelerate ions from the first source of ions;
    maintaining at a second potential a second acceleration electrode configured to accelerate ions from the second source of ions, where the second potential is not identical to the first potential; and
    defining a zone of interaction of the first pulsed beam and the second pulsed beam at a location that is not substantially midway between the first source of ions and the second source of ions.

15. The method of claim 11 further comprising:
    using as the sealed container a container that includes a first section and a second section, where the first section includes a first ion optical element, and the second section includes a second ion optical element that is not identical to the first ion optical element; and
    defining a zone of interaction of the first pulsed beam and the second pulsed beam at a location that is not substantially midway between the first source of ions and the second source of ions.

16. The method of claim 11 wherein the first source of ions and the second source of ions are pulsed substantially simultaneously.

17. The method of claim 11 wherein the first source of ions and the second source of ions are pulsed at different times.

18. The method of claim 11 further comprising conveying the tool into the borehole on a conveyance device configured to convey the tool into the borehole, the conveyance device being selected from: (i) a wireline, and (ii) a bottom hole assembly on a drilling tubular.

19. A non-transitory computer-readable medium product having stored thereon instructions that when read by a processor cause the processor to execute a method, the method comprising:
  estimating the value of a property using a signal produced by at least one detector conveyed in a borehole penetrating an earth formation and configured to be responsive to an interaction of neutrons with the earth formation, the neutrons being generated by an interaction in a sealed container between a first pulsed beam of ions generated by a first source of ions and a second pulsed beam of ions generated by a second source of ions.

20. The non-transitory computer-readable medium product of claim 19 further comprising at least one of: (i) a ROM, (ii) an EPROM, (iii) an EEPROM, (iv) a flash memory, or (v) an optical disk.

* * * * *